(12) United States Patent
Richter et al.

(10) Patent No.: US 8,570,502 B2
(45) Date of Patent: Oct. 29, 2013

(54) SCANNING MIRROR DEVICE

(75) Inventors: Stefan Richter, Jena (DE); Veljko Milanovic, Richmond, CA (US); Günter Rudolph, Jena (DE); Michel Stutz, Jena (DE); Gerhard Krampert, Jena (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 13/400,504

(22) Filed: Feb. 20, 2012

(65) Prior Publication Data
US 2012/0300197 A1 Nov. 29, 2012

Related U.S. Application Data

(60) Provisional application No. 61/444,846, filed on Feb. 21, 2011.

(30) Foreign Application Priority Data

Feb. 21, 2011 (DE) .......................... 10 2011 004 477

(51) Int. Cl.
*G01B 11/26* (2006.01)

(52) U.S. Cl.
USPC .......................................... 356/138; 356/139

(58) Field of Classification Search
USPC ........................ 356/138–139, 139.03–139.08, 356/364–369, 614–623, 399–401; 250/235, 250/236, 548, 239, 234, 202, 201.1, 216, 250/230, 227.11; 359/321, 290, 291; 385/18, 16; 398/17, 19
See application file for complete search history.

(56) References Cited

U.S. PATENT DOCUMENTS

| | | | |
|---|---|---|---|
| 4,564,757 A | 1/1986 | LaBudde et al. | |
| 5,131,744 A | 7/1992 | Kaneko et al. | |
| 5,450,202 A | 9/1995 | Tisue | |
| 6,787,745 B2 * | 9/2004 | Hajjar et al. | ............... 250/201.1 |
| 7,014,115 B2 | 3/2006 | Fu | |
| 7,136,172 B1 | 11/2006 | Johs et al. | |

(Continued)

FOREIGN PATENT DOCUMENTS

| DE | 102 05 207 B1 | 8/2003 |
|---|---|---|
| DE | 10357062 A1 | 7/2005 |

(Continued)

OTHER PUBLICATIONS

Veljkp Milanovic and Wing Kin Lo, "Fast and High-Precision 3D Tracking and Position Measurement with MEMS Micromirrors", Mirrorcle Technologies, Inc., Albany, CA, Aug. 11, 2008, 2 pages.

(Continued)

*Primary Examiner* — Tri T Ton
(74) *Attorney, Agent, or Firm* — Skaar Ulbrich Macari, P.A.

(57) ABSTRACT

There is provided a scanning mirror device with a microsystem scanning mirror which is mounted rotatably about at least one axis, and a detection module which has a light source which emits a light beam, and a position detector, wherein the detection module directs the light beam onto the scanning mirror from behind, with the result that the light beam is reflected, at the back of the scanning mirror, to the position detector which measures the position of the reflected light beam, from which the rotation angle of the scanning mirror about the at least one axis can be deduced.

16 Claims, 5 Drawing Sheets

(56) References Cited

U.S. PATENT DOCUMENTS

| | | |
|---|---|---|
| 7,190,502 B2 | 3/2007 | Filhol |
| 7,295,726 B1 | 11/2007 | Milanovic et al. |
| 7,924,441 B1 | 4/2011 | Milanovic |
| 2006/0158666 A1 | 7/2006 | Schelinski et al. |

FOREIGN PATENT DOCUMENTS

| | | | |
|---|---|---|---|
| EP | 0390969 A2 | 10/1990 | |
| JP | 2004-125554 A | 4/2004 | |
| WO | WO 03/012818 A1 | 2/2003 | |

OTHER PUBLICATIONS

English translation of the written opinion enclosed to the European Search report for European counterpart application 12 155 911.6 to the present application, 4 pages.

\* cited by examiner

SCANNING MIRROR DEVICE

PRIORITY

This application claims the benefit of U.S. Provisional Application Ser. No. 61/444,846, filed on Feb. 21, 2011 and German patent application DE 10 2011 004 477.9, filed Feb. 21, 2011, both of which are hereby incorporated by reference herein in their entireties.

FIELD

The present invention relates to a scanning mirror device with a microsystem scanning mirror which is mounted rotatably about at least one axis.

BACKGROUND

Microsystem scanning mirrors are known e.g. from U.S. Pat. No. 7,295,726 B1. Such microsystem scanning mirrors are often operated resonantly, with the result that the tilt angle oscillates at the resonant frequency of the scanning mirror and thus describes sinusoidal patterns or Lissajous patterns. In these cases, it is often sufficient if only the zero-crossing is detected. In the case of electrostatic comb-drives, this is primarily carried out by measuring the maximum capacity of the comb-drives during the oscillation. Piezoresistive and inductive measurements are also common.

Although, in the case of a quasistatic positioning of the scanning mirror, the capacities can still be measured in the case of comb-drives, it has been shown that this is too imprecise and also often does not correlate precisely with the tilt angle of the scanning mirror. It is not possible to measure the piezoelectric resistance of the solid state joints for moving the scanning mirror, because the solid state joints are too thin in the case of quasistatic mirrors.

SUMMARY

To solve the aforesaid problem, one object of the invention is to provide a scanning mirror device with a microsystem scanning mirror which is mounted rotatably about at least one axis, with which the rotation position of the scanning mirror can be measured precisely and continuously.

The object is achieved in certain embodiments by a scanning mirror device with a microsystem scanning mirror which is mounted rotatably about at least one axis, and a detection module which has a light source which emits a light beam, and a position detector, wherein the detection module directs the light beam onto the scanning mirror from behind, with the result that the light beam is reflected, at the back of the scanning mirror, to the position detector which measures the position of the reflected light beam, from which the rotation angle of the scanning mirror about the at least one axis can be deduced.

As the detection module carries out a contactless optical measurement of the tilt angle from behind, on the one hand, the tilt angle is measured directly and precisely. On the other hand, the measurement from behind has the advantage that the use of the microsystem scanning mirror for the intended purpose (thus e.g. the deflection of a laser beam directed towards the scanning mirror) is not impeded, as the detection module is not arranged in the normal working area (thus in front of the scanning mirror).

Preferably, the microsystem scanning mirror is mounted rotatably about two axes, wherein the detection module can measure the rotation or tilt angle about both axes.

The light source can be formed as an LED or as a laser, wherein the wavelength of the light beam preferably lies in the visible wavelength range and/or in the infrared range.

The detection module can be developed such that, on the basis of the output signals of the position detector, it emits an angle signal which represents the rotation angle about the at least one axis. Preferably, the angle signal is emitted continuously.

The scanning mirror preferably has a mirror or a deflection mirror as well as a tilting mechanism, wherein the deflection mirror can be connected to the tilting mechanism directly or via a support. Therefore, by the back of the scanning mirror is meant here in particular the back of the deflection mirror and/or a part of the support. It is essential that the back is the side onto which the e.g. laser or light beam to be deflected is not directed when the microsystem scanning mirror is being used for the intended purpose.

The detection module can have imaging optics that focus the light beam onto the back of the scanning mirror. In particular, the imaging optics can be 1:1 imaging optics.

Furthermore, the detection module can have projection optics which image the light beam reflected by the back of the scanning mirror onto the position detector as a collimated light beam. The projection optics can be part of the imaging optics. In particular, in this case, a beam splitter can be provided which serves to separate the light beam from the light source and the light beam reflected by the back of the scanning mirror.

Furthermore, the imaging optics can have at least two partial lens systems and the beam splitter can be arranged between the two partial lens systems. In this case, it is advantageous that the beam path between the two partial lens systems for the light beam of the light source is a collimated beam path.

The position detector can be formed for example as a quadrant detector. In this case, the detection module is preferably formed such that in all of the tilt positions to be measured the reflected light beam always strikes all quadrants of the quadrant detector.

The position detector can have a passage through which the light beam of the light source passes before it strikes the back of the scanning mirror.

Furthermore, the microsystem scanning mirror can be incorporated in a housing, wherein in the bottom of the housing a passage is formed through which the light beam can be directed onto the scanning mirror from behind. It is essential that the passage is transparent for the light beam of the light source. Thus, the passage can also be formed by an area of the bottom of the housing which is transparent for the light beam of the light source.

The scanning mirror device can have a control module which is connected to the position detector and the microsystem scanning mirror. The control module can be used to tilt the scanning mirror in controlled manner, wherein the tilt position is continuously ascertained by means of the detection module. In this case, the control module can also be called a monitoring module, as not only is a target value predetermined, but also an actual value is reacted to.

The microsystem scanning mirror can be a MEMS scanning mirror.

The microsystem scanning mirror can be formed monolithically.

The microsystem scanning mirror can comprise a deflection mirror and a tilting mechanism and there is further provided a carrier, wherein the tilting mechanism is formed on the carrier and connected with the deflection mirror in order to rotate the microsystem scanning mirror about the at least one axis.

The microsystem scanning mirror (and therefore the deflection mirror and the tilting mechanism) and the carrier can be formed monolithically. Examples for such a microsystem scanning mirror and for such a monolithic combination of deflection mirror, tilting mechanism and carrier can be found in U.S. Pat. No. 7,295,726 B1, for example. The whole content of U.S. Pat. No. 7,295,726 B1 is hereby incorporated herein by reference.

The carrier can have a passage through which the light beam of the light source can be directed on the back of the microsystem scanning mirror. The passage can be a through-hole (or an actual opening) or can be formed of a material which is transparent for the light beam of the light source.

The scanning mirror device according to the invention is preferably used in a laser scanning microscope, with the result that a laser scanning microscope is provided with the scanning mirror device according to the invention.

The detailed technology and preferred embodiments implemented for the subject invention are described in the following paragraphs accompanying the appended drawings for people skilled in this field to well appreciate the features of the claimed invention. It is understood that the features mentioned above and those yet to be explained below can be used, not only in the stated combinations, but also in other combinations or alone, without departing from the scope of the present invention.

DETAILED DESCRIPTION

In the following description, the apparatus, system and methods according to the present invention will be explained with reference to various example embodiments thereof. However, these example embodiments are not intended to limit the present invention to any specific environment, example, embodiment, applications, or particular implementations described in these example embodiments. Therefore, description of these example embodiments is only for purpose of illustration rather than to limit the present invention.

Figure 1:
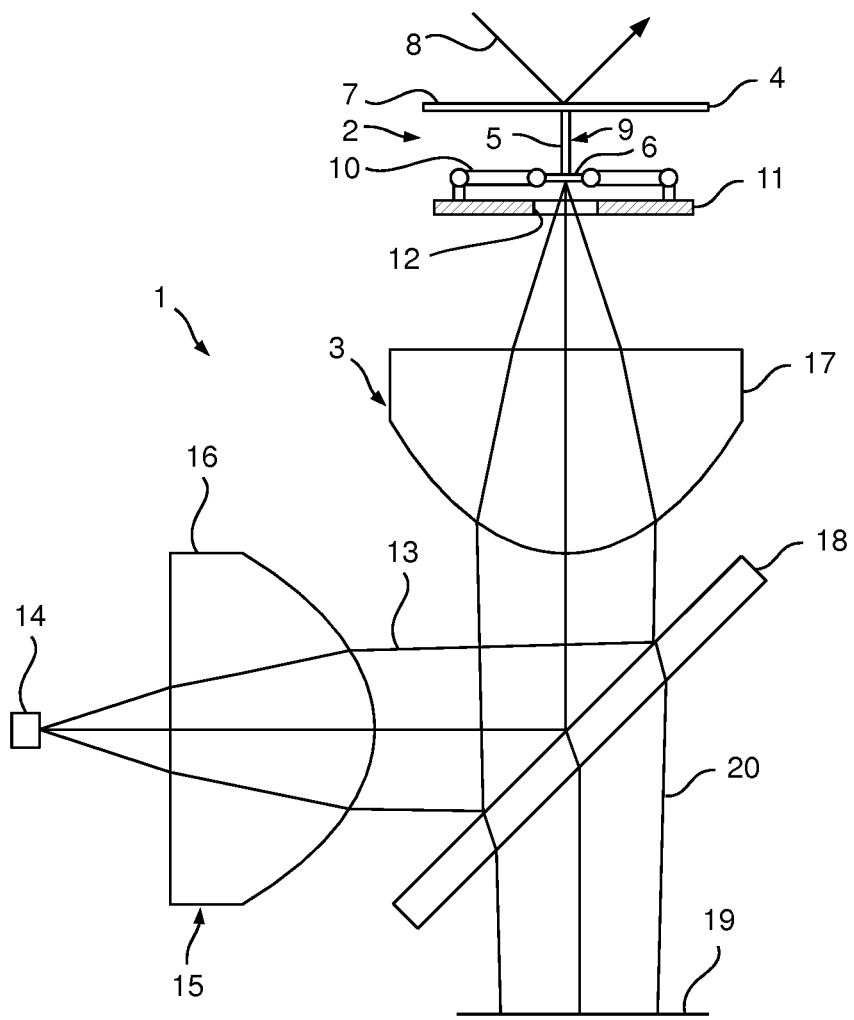
FIG. 1 is a schematic view of a first embodiment of the scanning mirror device according to the invention.

In the embodiment shown in FIG. 1, the scanning mirror device 1 according to the invention comprises a microsystem scanning mirror 2 and a detection module 3. The microsystem scanning mirror 2 comprises a mirror plate 4 with a diameter of e.g. 2.5 mm which is connected by means of a bar 5 to a base plate 6 which has e.g. a diameter of 300 μm. The top of the mirror plate 4 is coated with a reflective coating and thus forms a mirror 7 which reflects incident radiation, as is indicated by the schematically represented beam course 8. The mirror plate 4, the bar 5 and the base plate 6 form a support 9 to which the mirror 7 is connected.

Figure 3:
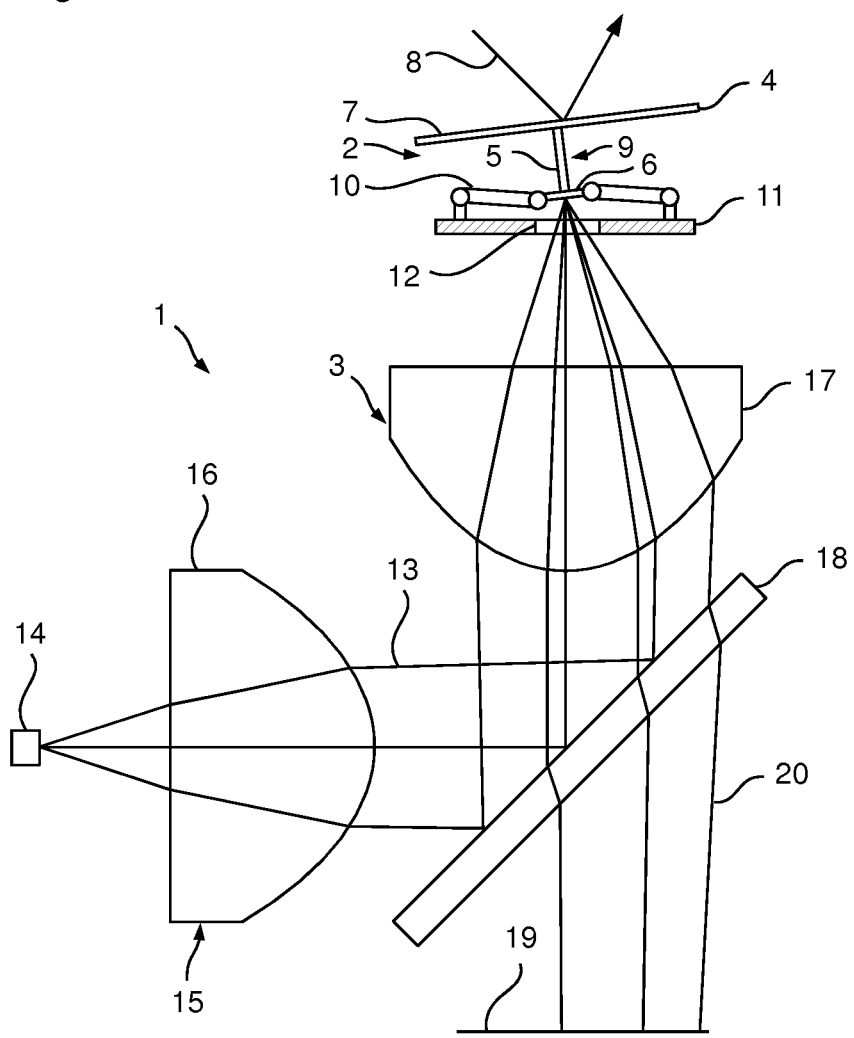
FIG. 3 is a view of the scanning mirror device of FIG. 1 with a different tilt position of the mirror 7.

The support 9 can be rotated about an axis running perpendicular to the image plane by means of the schematically represented tilting mechanism 10. The tilting mechanism 10 is formed on a carrier 11 (or substrate). Another tilt or rotation position of the support 9 and thus of the mirror 7 is shown schematically in FIG. 3.

The MEMS scanning mirror 2 is formed monolithically. Specific embodiments of such a microsystem scanning mirror, which can also be called a MEMS scanning mirror (MEMS=Micro-Electro-Mechanical-System), can be found e.g. in U.S. Pat. No. 7,295,726 B1.

In the case of the scanning mirror device 1 described here, the carrier 11, unlike previously known MEMS scanning mirrors, has a passage 12, with the result that the rotation angle of the support 9 (here of the base plate 6) and thus of the mirror 7 can be measured in contactless manner from behind by means of the detection module 3.

For the contactless measurement of the rotation angle of the support 9, the detection module 3 comprises a light source 14 (here e.g. a laser diode) which emits a light beam 13, 1:1 imaging optics 15 with a first lens 16, a second lens 17 as well as a partially transparent plate 18 arranged between the two lenses 16, 17 and a quadrant detector 19.

As can be seen from the schematically drawn-in beam course in FIG. 1, the outlet (assumed here to be punctiform) of the light source 14 is imaged onto the bottom of the base plate 6 by means of the 1:1 imaging optics 15 and through the passage 12 of the carrier 11, with the result that the light beam 13 is focused onto the bottom of the base plate 6. The radiation reflected at the base plate 6 is imaged by means of the second lens 17 as a substantially collimated ray beam 20 by the partially transparent plate 18 onto the quadrant detector 19. As can be seen from the top view of the quadrant detector in FIG. 2, the collimated ray beam 20 strikes the quadrant detector 19 centrally such that in each case a quarter of the radiation intensity strikes each of the four quadrants 211, 212, 213 and 214 of the quadrant detector 19.

Figure 2:
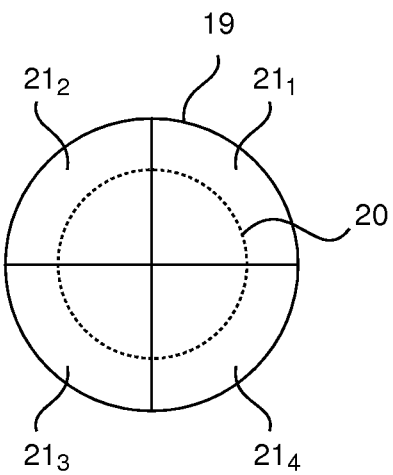
FIG. 2 is a top view of the quadrant detector 19 of FIG. 1.
Figure 4:
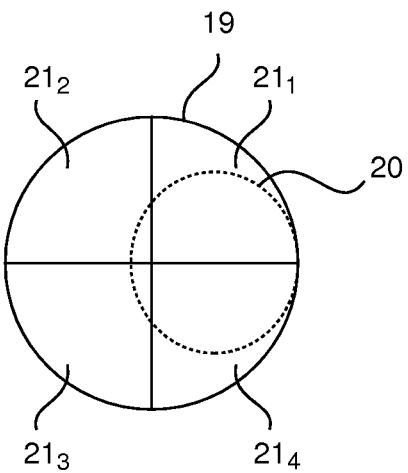
FIG. 4 is a top view of the quadrant detector for the tilt position of the mirror 7 according to FIG. 3.

If the mirror 7 and thus the support 9 of the microsystem scanning mirror 2 is tilted about the axis, the collimated ray beam 20 travels over the quadrant detector 19, as is indicated in the representations of FIG. 2 and FIG. 4. By evaluating the radiation intensity striking each of the four quadrants 211, 212, 213 and 214 the respective tilt position of the mirror 7 can thus be measured in contactless manner.

The passage 12 can be formed as an actual opening or can be produced from a material transparent for the light beam 13. Of course, the whole carrier 11 can also be a material transparent for the light beam 13.

In the description up to now, it has been assumed that the support 9 can be tilted only about a first axis perpendicular to the plane of drawing in FIG. 1. Of course, the MEMS scanning mirror 2 can be formed such that a tilting about a second axis which lies in the plane of drawing of FIG. 1 and runs perpendicular to the first axis is also possible. The tilt position about the second axis can also be measured in contactless manner with the detection module 3 described here, as in the case of such a tilting the radiation intensity respectively striking the quadrants 211 and 214 as well as 212 and 213 is no longer of equal magnitude.

As, in the case of the scanning mirror device 1 according to the invention, the respective tilt position of the microsystem scanning mirror 2 is measured in contactless manner from behind, no intervention is required as regards the beam course 8 and thus the working beam course of the scanning mirror 7, which is advantageous. Thus, a compact beam course 8 not optically degraded by the detection module 3 can be achieved. The scanning mirror device 1 according to the invention can be used e.g. in a laser scanning microscope to carry out the necessary deflection of the laser beam for the image generation.

If the microsystem scanning mirror 2 is installed in a housing or a so-called package, an opening is provided in the housing or package at the bottom according to the invention such that the light of the light source 14 can be directed onto the base plate 6 of the support 9 in the described manner from behind in order to detect the rotation position of the support 9 and thus of the mirror 7 in contactless manner.

With the described structure, it is possible to detect the tilt position of the mirror 7 at a few hundred Hz to a few MHz, with the result that a control of the tilt position of the mirror 7 based on the measured tilt position can be realized satisfactorily. In particular, a control loop can thus be provided with which desired tilt positions or a tilt position course are carried out in controlled manner.

The illuminated bottom of the base plate 6 can, but need not, be metalized.

The described formation of the detection module 3 with the collimated ray beam 20 is furthermore of advantage in that an adjustment of the detection module 3 can be easily carried out.

Figure 5:
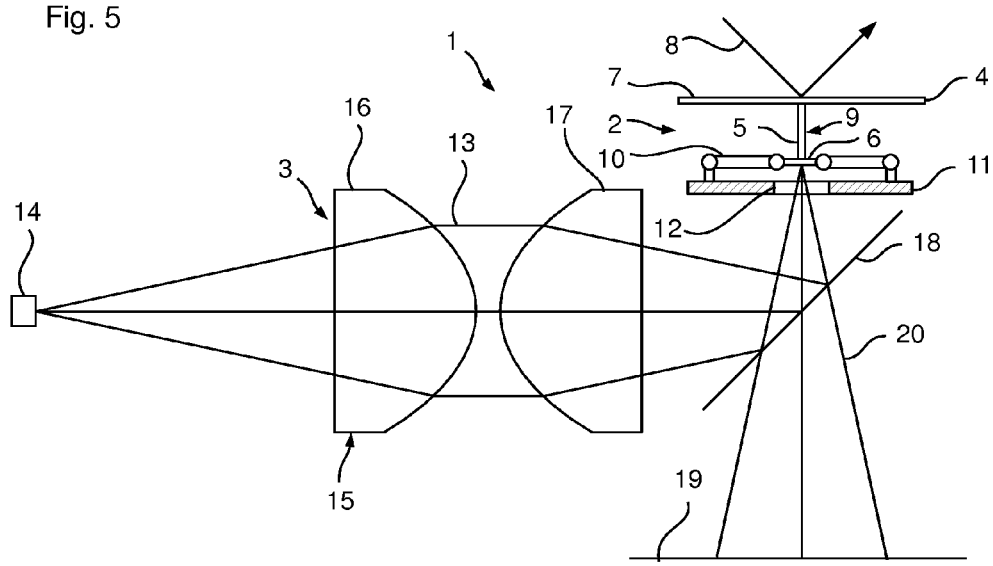
FIG. 5 is a view of a second embodiment of the scanning mirror device according to the invention.
Figure 6:
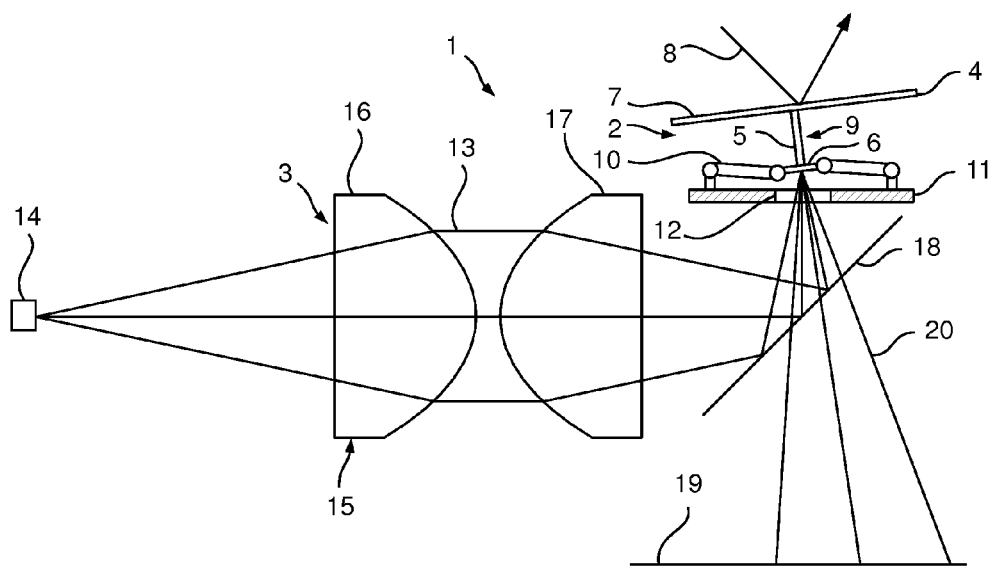
FIG. 6 is a view of the scanning mirror device of FIG. 5 with a different tilt position of the mirror 7.

A variant of the scanning mirror device 1 according to the invention is shown in FIGS. 5 and 6. Here, as well as in the following embodiments, identical or similar elements are given the same reference numbers and reference is made to the above statements for their description.

In the embodiment according to FIGS. 5 and 6, the partially transparent plate 18, which is represented only schematically in FIGS. 5 and 6, is not arranged between the two lenses 16 and 17, but between the back lens 17 and the carrier 11. Because of this formation, the ray beam reflected at the base plate 6 strikes the quadrant detector 19 as a divergent ray beam 20.

Figure 7:
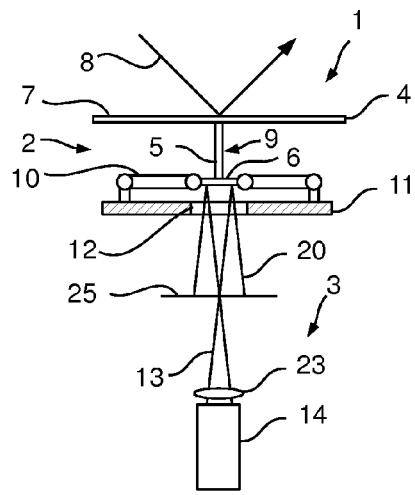
FIG. 7 is a view of a third embodiment of the scanning mirror device according to the invention.
Figure 8:
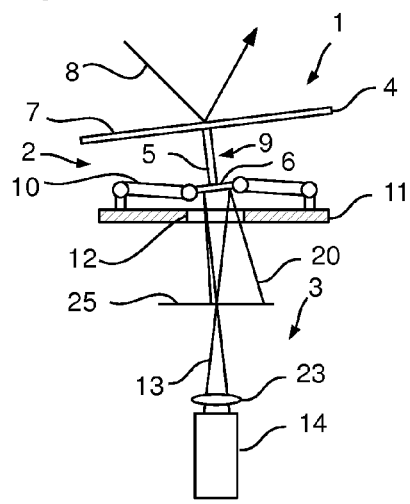
FIG. 8 is a view of the scanning mirror device according to FIG. 7 with a different tilt position of the mirror 7.
Figure 9:
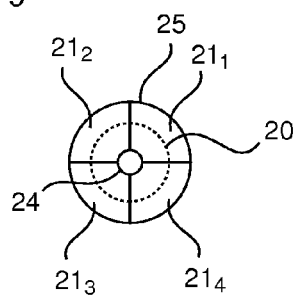
FIG. 9 is a schematic top view of the quadrant detector 25 of the scanning mirror device according to FIGS. 7 and 8.

A further variant of the scanning mirror device 1 according to the invention is shown in FIGS. 7 and 8. In this variant, no 1:1 imaging optics are provided. Instead, there are focusing optics 23 which focus the ray beam 13 emitted by the light source 14 into a central opening 24 of the quadrant detector 25, with the result that the ray beam 13 of the light source 14 passes through the quadrant detector 25 and strikes the back of the base plate 6 and from there is reflected back onto the quadrant detector 25. The quadrant detector 25 is shown schematically in FIG. 9 in top view and differs from the quadrant detector 19 essentially only by the central opening 24 that is provided. The tilt position of the support 9 and thus of the mirror 7 can then be determined in the same way as in the previous embodiments, by means of the quadrant detector 25.

Figure 10:
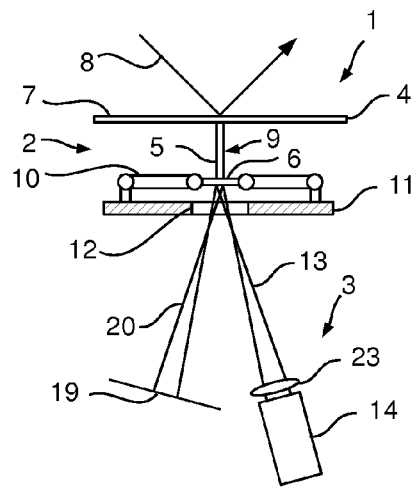
FIG. 10 is a view of a fourth embodiment of the scanning mirror device according to the invention.
Figure 11:
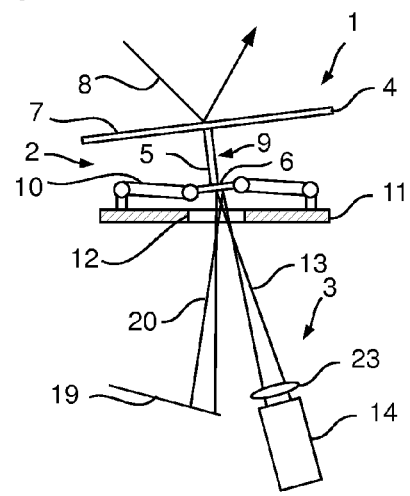
FIG. 11 is a view of the scanning mirror device of FIG. 10 with a different tilt position of the mirror 7.

A variant of the scanning mirror device 1 according to the invention is shown in FIGS. 10 and 11, in which the base plate 6 is not illuminated perpendicularly from below, as in the previous embodiments, but at a predetermined angle of incidence and thus at an angle from below. The quadrant detector 19 is therefore also correspondingly arranged such that the ray beam 20 reflected at the bottom of the base plate strikes the quadrant detector 19. As can be seen in the schematic representations of FIGS. 10 and 11, the tilt position of the support 9 and thus of the mirror 7 can thus be detected in the same way as in the previous embodiment examples.

In the described embodiments in each of which a quadrant detector 19, 25 is provided, the detection module 3 is in each case designed such that the ray beam 20 strikes all four quadrants 211-214 at each tilt position in each case.

Figure 12:
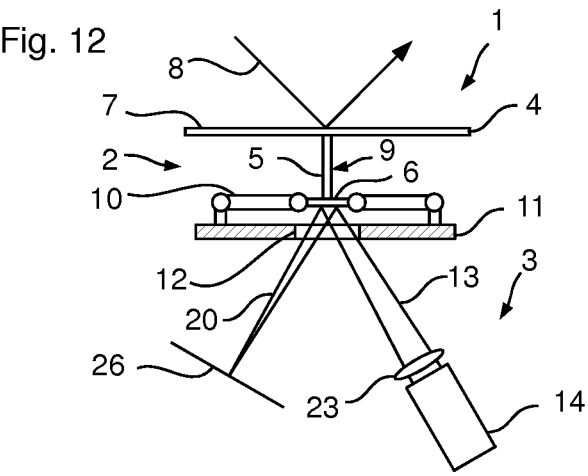
FIG. 12 is a view of a fifth embodiment of the scanning mirror device according to the invention.
Figure 13:
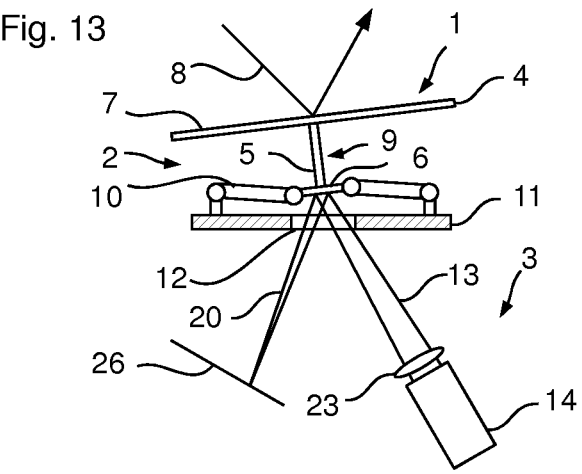
FIG. 13 is a view of the scanning mirror device of FIG. 12 with a different tilt position of the mirror 7.

A variant of the scanning mirror device 1 according to the invention is shown in FIGS. 12 and 13, in which the ray beam reflected at the bottom of the base plate 6 is first focused on a position detector 26. The position detector 26 is formed such that with it the position of the incident focused light spot can be determined in one or two dimensions. In the case of a one-dimensional determination, the tilting about a first axis perpendicular to the plane of drawing can be determined. In the case of a two-dimensional position determination, the tilting about an axis perpendicular to the first axis can also be determined.

In the described embodiments, the ray beam 13 was always reflected at the bottom of the base plate 6. Depending on the structure of the microsystem scanning mirror 7, it can also happen that the ray beam 13 is reflected at the back of the mirror 7.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A scanning mirror device, comprising:
    a MEMS microsystem scanning mirror rotatably mounted about at least one axis to the scanning mirror device; and
    a detection module, including a light source which emits a light beam, a position detector, imaging optics configured to focus the light beam onto the back of the scanning mirror, and projection optics configured to image the light beam reflected by the back of the scanning mirror as a collimated light beam onto the position detector,
    wherein the detection module directs the light beam onto the scanning mirror from behind, with the result that the light beam is reflected, at the back of the scanning mirror, to the position detector which measures the position of the reflected light beam, from which the rotation angle of the scanning mirror about the at least one axis can be deduced.

2. The scanning mirror device according to claim 1, wherein the imaging optics are formed as 1:1 imaging optics.

3. The scanning mirror device according to claim 1, wherein the imaging optics includes a beam splitter configured to separate the light beam from the light source and the light beam reflected by the back of the scanning mirror.

4. The scanning mirror device according to claim 3, wherein the imaging optics further includes at least two partial lens systems and the beam splitter is arranged between the two partial lens systems.

5. The scanning mirror device according to claim 1, wherein the detection module is configured to emit, using the measured position of the reflected light beam, an angle signal representing the rotation angle of the scanning minor about the at least one axis.

6. The scanning mirror device according to claim 1, wherein the position detector is formed as a quadrant detector.

7. The scanning mirror device according to claim 1, wherein the light beam of the light source passes through the position detector and strikes the back of the scanning mirror.

8. The scanning mirror device according to claim 1, wherein the microsystem scanning mirror is incorporated in a housing, wherein the bottom of the housing includes a passage through which the light beam of the light source can be directed onto the back of the scanning mirror.

9. The scanning mirror device according to claim 8, wherein the detection module is configured to emit, using the measured position of the reflected light beam, an angle signal representing the rotation angle of the scanning mirror about the at least one axis.

10. The scanning mirror device according to claim 1, wherein the detection module is configured to emit, using the measured position of the reflected light beam, an angle signal representing the rotation angle of the scanning mirror about the at least one axis.

11. The scanning mirror device according to claim 1, wherein the microsystem scanning mirror is formed monolithically.

12. The scanning mirror device according to claim 1, wherein the microsystem scanning mirror comprises a deflection mirror and a tilting mechanism, wherein a carrier is provided and the tilting mechanism is formed on the carrier and connected with the deflection mirror in order to rotate the microsystem scanning mirror about the at least one axis.

13. The scanning mirror device according to claim 12, wherein the carrier includes a passage through which the light beam of the light source can be directed onto the back of the microsystem scanning mirror.

14. The scanning mirror device according to claim 12, wherein the microsystem scanning mirror and the carrier are formed monolithically.

15. The scanning mirror device according to claim 14, wherein the carrier includes a passage through which the light beam of the light source can be directed onto the back of the microsystem scanning mirror.

16. The scanning mirror device according to claim 1, wherein the carrier includes a passage through which the light beam of the light source can be directed onto the back of the micro system scanning minor.

* * * * *

UNITED STATES PATENT AND TRADEMARK OFFICE
CERTIFICATE OF CORRECTION

PATENT NO. : 8,570,502 B2  
APPLICATION NO. : 13/400504  
DATED : October 29, 2013  
INVENTOR(S) : Stefan Richter et al.

Page 1 of 1

It is certified that error appears in the above-identified patent and that said Letters Patent is hereby corrected as shown below:

In the Claims

Column 7, line 2 (claim 5): Delete "minor" and replace with --mirror--.

Column 8, line 23 (claim 16): Delete "minor" and replace with --mirror--.

Column 8, line 23 (claim 16): Delete "micro system" and replace with --microsystem--.

Signed and Sealed this  
Twentieth Day of May, 2014

Michelle K. Lee  
*Deputy Director of the United States Patent and Trademark Office*